United States Patent [19]

Wilson et al.

[11] Patent Number: 4,982,080
[45] Date of Patent: Jan. 1, 1991

[54] RADIATION DETECTING ARRAY INCLUDING UNIT CELLS WITH PERIODIC OUTPUT SIGNALS EACH WITHIN A UNIQUE FREQUENCY BAND

[75] Inventors: Jerry A. Wilson; Michael D. Jack, both of Goleta, Calif.

[73] Assignee: Santa Barbara Research Center, Goleta, Calif.

[21] Appl. No.: 266,743

[22] Filed: Nov. 3, 1988

[51] Int. Cl.$^5$ .............................................. H01J 40/14
[52] U.S. Cl. ............................. 250/208.2; 250/578.1; 324/77 K
[58] Field of Search ................... 250/578, 578.1, 208.2, 250/208.3; 324/77 K; 357/5

[56] References Cited

U.S. PATENT DOCUMENTS

| | | | |
|---|---|---|---|
| 4,636,718 | 1/1987 | Labrum et al. | 324/77 K |
| 4,695,790 | 9/1987 | Mathis | 324/77 K |
| 4,831,421 | 5/1989 | Gallagher et al. | 357/5 |
| 4,837,604 | 6/1989 | Faris | 357/5 |

Primary Examiner—David C. Nelms
Assistant Examiner—Stephone B. Allen
Attorney, Agent, or Firm—W. C. Schubert; W. K. Denson-Low

[57] ABSTRACT

A radiation detecting array 10 has a frequency domain architecture wherein incident radiation is imaged in parallel by an array of radiation detectors 12-16. Each radiation detector has an associated amplitude to frequency conversion device 18-22 for providing output signals wherein the output of each photodetector is represented as a frequency within a uniquely identified band of frequencies, the specific frequency being a function of the output signal amplitude of the photodetector. The readout of one or more selected detectors is accomplished by providing a swept frequency band or bands associated with the desired detector or detectors and mixing the detector frequencies with the swept band. The frequency representing the photodetector output may be input directly to a low dispersion transmission line 30. The unit cells may include radiation detectors comprised of superconducting material and also superconducting components that inherently manifest current or voltage to frequency conversion characteristics in accordance with the Josepson effect. An array having high temperature superconducting components includes photodetectors 60, associated voltage to frequency convertors 64 and a transmission line 70 integrated upon a common substrate.

23 Claims, 4 Drawing Sheets $$f_i = [I_{DET}(\rho\lambda) + I_{TRIMi}]R_S\left(\frac{2e}{h}\right)$$

RADIATION DETECTING ARRAY INCLUDING UNIT CELLS WITH PERIODIC OUTPUT SIGNALS EACH WITHIN A UNIQUE FREQUENCY BAND

FIELD OF THE INVENTION

This invention relates generally to radiation detectors and, in particular, to an array of photodetectors wherein data acquired by the array is output in parallel on a common transmission means; individual photodetector outputs each being represented as a frequency within a unique band of frequencies. The invention also relates to such an array of photodetectors comprised of superconducting material.

BACKGROUND OF THE INVENTION

Conventional arrays of photodetectors typically multiplex detector amplitude information sequentially in time. The amplitude information is generally a function of the radiation flux incident upon individual detectors within a one or two-dimensional array of photodetectors. For example, an integrated circuit two-dimensional focal plane array of photodetectors may be responsive to incident radiation within the infra-red (IR) portion of the electromagnetic spectrum. Each photodetector within the array is typically defined as a unit cell of the array. Each unit cell may be further coupled to a unit cell of an associated readout circuit array wherein each readout unit cell may comprise an integrating transimpedance amplifier. Each transimpedance amplifier may have an output coupled to a multiplexer which sequentially outputs to a signal processor signals expressive the flux incident upon individual ones of the photodetector unit cells over a predetermined interval of time.

For focal plane and other applications the array of photodetectors is normally maintained at cryogenic temperatures within a Dewar. For example, the array may be maintained at approximately 77K by the operation of a liquid nitrogen cryogenic system.

One problem associated with such conventional systems, due to the serial nature of the data stream, relates to the amount of time required to output all of the photodetector unit cells within the array. In order to provide for real-time detector operation it is often necessary to constrain the total number of unit cells to a number which may be read out and processed within an interval of time which is compatible with real-time operation. As a result, the imaging resolution of the array may be less than optimal for a given application.

Another problem associated with conventional imaging systems is that access to a particular unit cell or group of unit cells within the array is constrained by the sequential nature of the readout circuit. This may prove disadvantageous if it is desired to perform zoom, background subtraction, gamma suppression, offset/gain correction or similar operations. As a result, it may be necessary to provide high speed analog and digital signal processing circuitry with concomitant increases in system power consumption, electrical noise and package size.

SUMMARY OF THE INVENTION

The aforementioned and other problems are overcome and other advantages are realized by a radiation detecting array constructed and operated in accordance with the invention. In accordance with the invention a radiation detecting array has a frequency domain architecture wherein incident radiation is imaged in parallel by an array of radiation sensors, the imaging array providing an output signal as a parallel data stream on a single bus wherein the output of each photodetector is represented as a frequency within a uniquely identified band of frequencies. The specific frequency within each band of frequencies is a function of the output signal amplitude of the photodetector. By associating a specific frequency band with each photodetector the data stream can be combined upon a single bus thereby providing, relative to conventional serial data stream systems, a significant improvement in both detector access time and overall array data reduction. There is also provided a significant improvement in electrical noise immunity and an inherent system hardness to ionizing radiation. The invention further provides for the readout of one or more specific detectors by addressing or selecting a frequency band or bands associated with the desired detector or detectors. This feature enables the implementation of zoom or tracking functions without excessive signal processing requirements. Also large signal offsets which are induced by radiation, and which result in relatively large frequency shifts, may be discriminated against. Furthermore, frequency shifts due to system noise may be reduced by signal averaging. In accordance with one embodiment of the invention the frequency representing the photodetector output may be input directly to a low dispersion transmission line thereby eliminating the conventional requirement for switching and decoding circuitry, resulting in a significant reduction in circuitry and overall package size.

Conventional radiation detecting arrays comprised of semiconductor detectors, such as Si, GaAl, InSb or HgCdTe material, may be provided, in accordance with the invention, with a frequency domain architecture by the addition of an amplitude to frequency conversion component within each unit cell.

A further significant feature of the invention is that there is provided photodetector array unit cells which include radiation detectors comprising superconducting material and also superconducting components which inherently manifest current or voltage to frequency conversion characteristics. In accordance with this aspect of the invention there is disclosed a frequency domain radiation detecting unit cell having superconducting components including a photodetector, a voltage to frequency convertor and an output transmission line all of which are integrated upon a common substrate.

BRIEF DESCRIPTION OF THE DRAWINGS

These and other aspects of the invention will be made more apparent in the following Detailed Description of the Invention read in conjunction with the accompanying Drawing wherein:

FIG. 3b is a graph which illustrates the current steps as a function of voltage of the mixer of FIG. 3a;

DETAILED DESCRIPTION OF THE INVENTION

Although the invention will be described in the context of an array of sensors for sensing electromagnetic radiation, such as infra-red radiation, it should be realized that the teaching of the invention is applicable generally to many types of arrays of sensors, such as an array of acoustic sensors.

Figure 1:
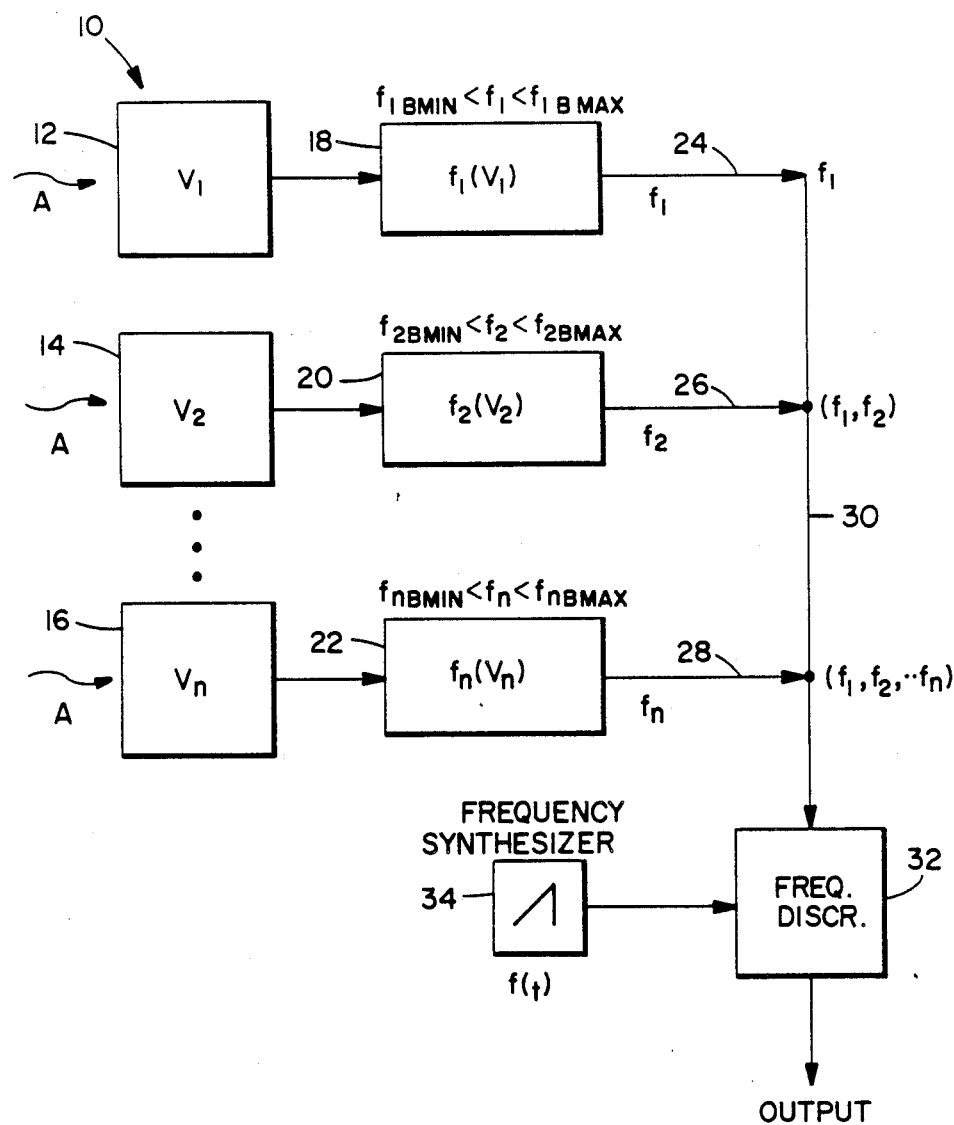
FIG. 1 is a block diagram showing a plurality of radiation detectors each of which is coupled to an associated voltage to frequency conversion device, each of these devices having an output coupled to a transmission line which is further coupled to an input of a frequency discriminator.

Referring now to FIG. 1 there is shown a block diagram of a radiation sensor array 10 which, in accordance with the invention, comprises a plurality of radiation detectors 12-16 each of which is responsive to incident radiation for converting incident radiation, indicated by the arrows A, to an output signal. The output of detectors 12-16 may be represented as a voltage ($V_1$-$V_n$) which is coupled to the input of an associated voltage to frequency (V/F) conversion device 18-22. Each device 18-22 generates an output frequency which is within a unique, predetermined range of frequencies, the range of frequencies being designated herein as a "frequency bin". The instantaneous output frequency of each device 18-22 is thus a function of the radiation flux incident upon an associated detector. That is, each of the devices 18-22 outputs a frequency ($f_i$) within a unique frequency band. Each frequency band is chosen such that adjacent bands are not overlapping for the range of radiation detector output voltage within the inherent dynamic range of the detector.

The frequency output of each device 18-22 is coupled via an associated conductor 24-28 to a low loss transmission line 30, such as an optical fiber, which transmits the device output frequencies to a frequency discriminator 32. The frequency discriminator 32 operates to provide an output signal which is related to the magnitude of the array output signals. The output signal of discriminator 32 may be a plurality of pulses each of which occurs within a predetermined interval of time. Each predetermined interval of time is associated with a particular detector 12-16 such that the occurence of a pulse within the period of time is a function of the amplitude of the detector output $V_i$. Frequency discriminator 32 preferably has a frequency synthesizer 34 coupled thereto for providing during each predetermined interval of time a swept band of frequencies, each swept band corresponding to the frequency bin of a particular detector. In general, frequency discriminator 32 generates an output pulse or signal when the frequency of synthesizer 34 corresponds to the frequency $F_i$ of a particular one of the detectors 12-16.

Figure 2:
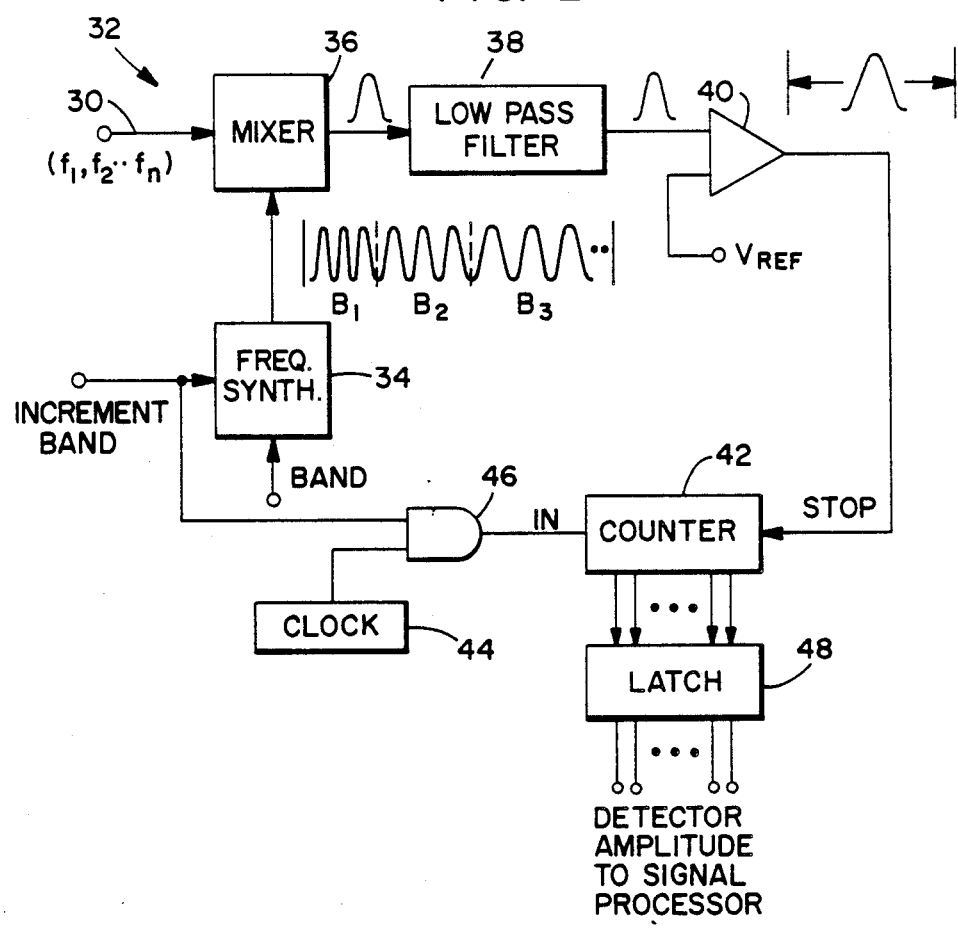
FIG. 2 shows in block diagram form one embodiment of the frequency discriminator of FIG. 1.

Referring now to FIG. 2 there is shown one embodiment of the frequency discriminator 32 of FIG. 1. The input to the discriminator 32 is a plurality of frequencies ($f_1, f_2 \ldots f_n$) which are fed either sequentially or simultaneously to a frequency mixer 36. The frequency synthesizer 34 is coupled to an input of mixer 36 and provides a swept band (B1, B2, B3 etc.) of frequencies thereto. An Increment Band signal is provided to synthesizer 34 for shifting or changing the output band of frequencies. In practice, synthesizer 34 may be a chirp generator. The output of mixer 36 may be a pulse which occurs when the chirp frequency output of synthesizer 34 corresponds to one of the input signal frequencies ($f_1, f_2 \ldots f_n$). A low pass filter 38 may be provided for filtering the output of mixer 36 before it is applied to a comparator 40. Comparator 40 includes a reference input $V_{REF}$ against which the pulse output of mixer 36 is compared. Comparator 40 generates an output when the pulse amplitude exceeds the amplitude of the reference level. This pulse output may be applied to a counter 42 to halt the counting operation thereof, the counter 42 further having a count input coupled to a clock frequency provided by a clock source 44. A gate 46 is provided for applying the clock frequency to counter 42 only during those times when the frequency synthesizer 34 is not being shifted to another frequency bin. The occurrence of the pulse output of comparator 40 therefore stops the operation of counter 42, the particular point in the count cycle where the counter 42 is halted being determined by the frequency input to mixer 36. The counter output is stored by an associated output latch 48. Preferably, the counter 42 is a preset counter which is initiated to a predetermined value in syncronism with the start of a frequency sweep of the synthesizer 34. The counter 42 is also reset during the time a different frequency bin is selected, it being remembered that each frequency bin corresponds to an individual detector 12-16. The pulse output from comparator 40 is employed to cause the latch 48 to store the value of the counter 42. The output of latch 48 is input to a signal processor (not shown) wherein signal processing related to the incident radiation is accomplished. This signal processing relates to, for example, target identification, acquisition and tracking. Typically, the signal processor also drives the Increment Band signal.

It should be realized that the output of one or some subset of the total number of detectors within an array is obtained by providing to mixer 36 only those frequency bins which correspond to the desired detector or detectors. Thus, zoom and tracking functions may be accomplished. Furthermore, background subtraction may be accomplished by recording the scan frequencies and initially presetting counter 42 to a value which corresponds to the radiation background level at each detector 12-16 site.

One aspect of the invention provides for a frequency domain radiation detecting array comprised of superconducting material which exhibits the Josephson effect. The invention is especially advantageous when employed with superconducting material which exhibits superconductivity operating below an associated critical temperature. Examples of such material are YBaCuO, BiSrCaCuO and TlCaBaCuO. Such materials are characterized as being high temperature superconductors (HTS) although any superconducting material is within the scope of the invention.

Figure 3A:
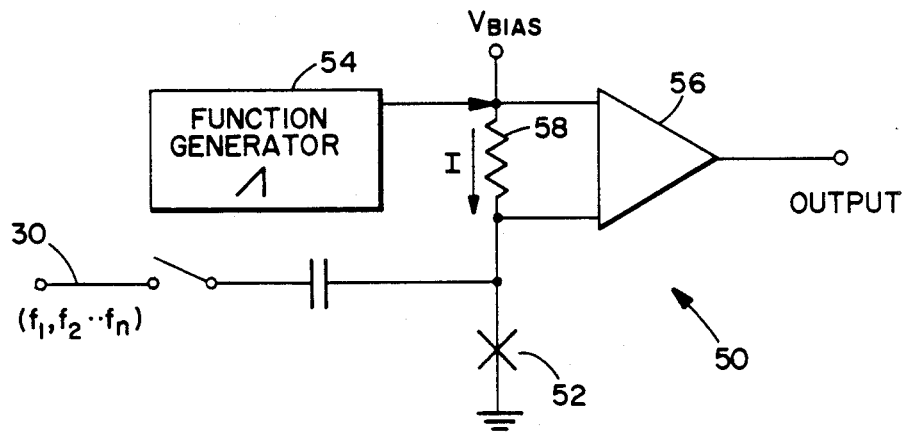
FIG. 3a shows a superconducting mixer and low pass filter which converts output frequencies of individual radiation detecting unit cells to current steps.
Figure 3B:
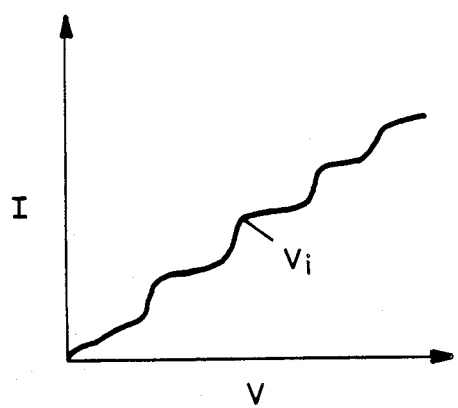

Referring to FIG. 3A there is shown one suitable frequency discriminator 50 which is comprised of a superconducting element 52 such as a Josephson Junction or a weak link which operates in the Josephson mode. That is, element 52 operates in accordance with the equation $V = 2e/hf$, where e is electronic charge and h is Planck's constant. The frequency discriminator 50 operates to convert the input frequencies ($f_1, f_2, \ldots f_n$)

from the photodetecting array to current steps. A function generator 54 is provided for producing, for example, a sawtooth waveform which is indicated as the signal $V_{BIAS}$. A comparator 56 has coupled between two input nodes a resistance 58 across which are coupled $V_{BIAS}$ and the input frequencies. The graph of FIG. 3B shows the operation of the element 52 wherein it can be seen that as the magnitude of $V_{BIAS}$ is linearly increased along the X axis that a number of "steps" appear in the current waveform, each step corresponding to one of the input frequencies. These current steps are detected by comparator 56 which provides an output to a differentiator (not shown). Due to the operation of the Josephson element 52 the occurrence of a particular current step relative to the period of the linearly increasing sawtooth waveform is indicative of the magnitude of a corresponding photodetector output. It can be appreciated that due to the inherent voltage to frequency conversion characteristic of Josephson element 52 that the linearly increasing sawtooth waveform effectively "sweeps" the mixer 50 through a plurality of frequency bands.

Figure 4:
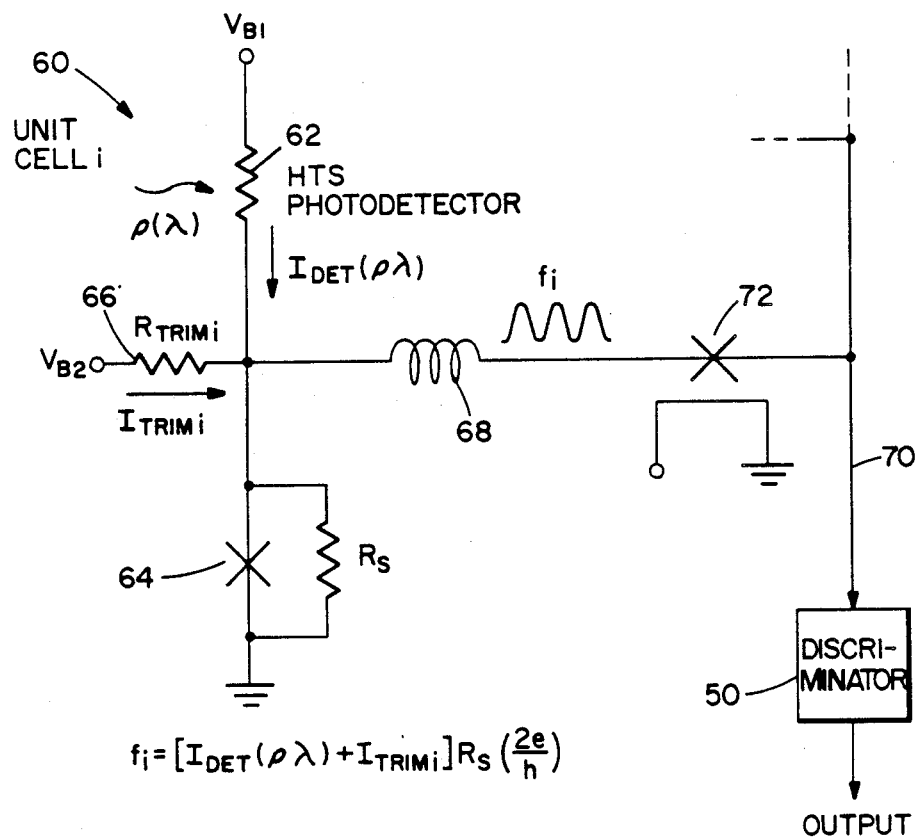
FIG. 4 illustrates an embodiment of a unit cell comprised of superconducting components including a weak link or a Josephson Junction voltage to frequency converter.

Referring now to FIG. 4 there is shown a single unit cell 60 of a photodetecting array, it being realized that a typical array would comprise a plurality of such unit cells. For example, the array may be a two dimensional array of 64×64 unit cells. The unit cell 60 comprises a superconducting photodetector 62 which converts incident radiation indicated by the arrow designated p(λ) to a current. The photodetector 62 includes a superconductive region, such as a HTS film, which has a bias $V_{B1}$ and which operates as a voltage source for a resistively shunted Josephson Junction or weak link voltage controlled oscillator (VCO) 62. VCO 62 typically has a substantially lower impedance than the photodetector 62. The Josephson relationship, $V = 2e/hf$, results in a linear relationship between the detector current and the output frequency $f_i$. This linear relationship is expressed by the equation $I_{DET} = V_{B1}/R_s$. A linear frequency offset is achieved by the addition a second bias source, $V_{B2}$, to provide an offset current, designated by $I_{TRIMi}$, through a fixed or programmable resistance $R_{TRIMi}$ 66. The resistance value of $R_{TRIMi}$ for each photodetector of the array is preferrably different in order to provide to each photodetector within the array with a different value of offset voltage and, hence, a distinct, nonoverlapping frequency band. An impedance such as choke 68 placed in series with an output line develops the output frequency $f_i$. The output frequency from the aforedescribed VCO 62 may be coupled directly to a superconducting transmission line 70 or may be coupled through a Josephson Junction current switch 72. Preferably the transmission line 70 is a racetrack type transmission line in order to minimize reflections of the periodic sinusoid or pulsed train output generated by the Josephson Junction VCO 62. A frequency discriminator, such as the discriminator 50 of FIG. 3A, is coupled to transmission line 70 in order to detect the frequency output.

Figure 5:
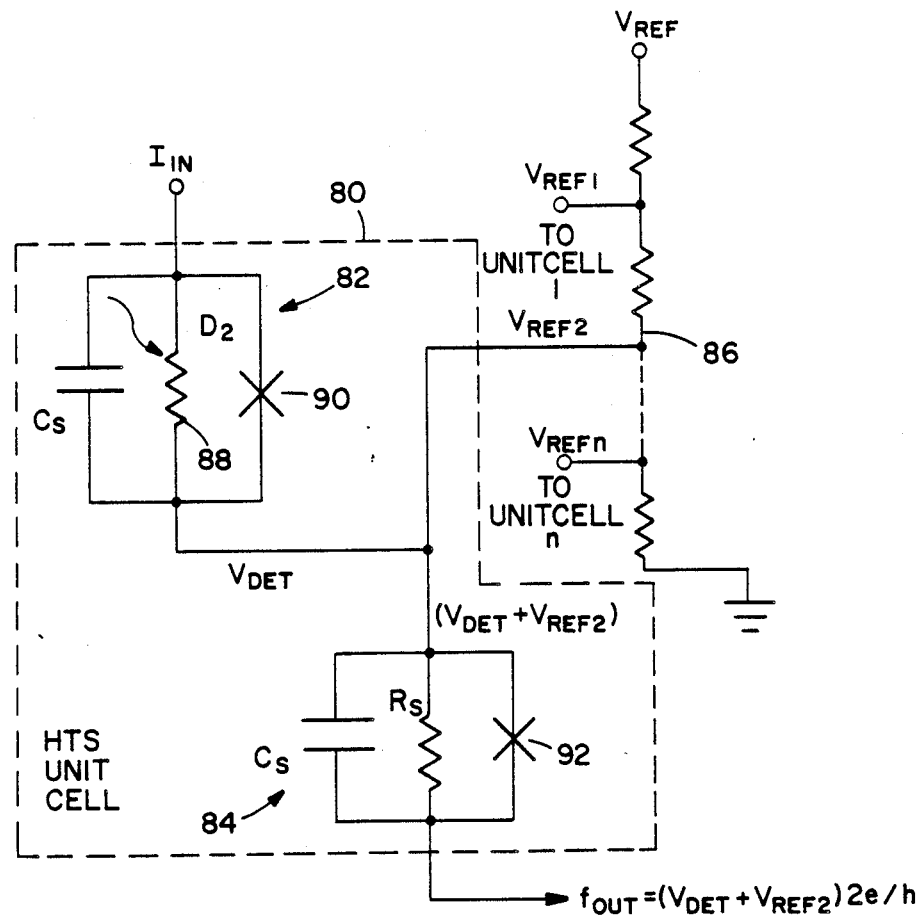
FIG. 5 shows another embodiment of a unit cell for a photodetecting array comprised of superconducting material which includes a superconditive photodetector coupled to a weak link or a Josephson Junction voltage to frequency converter.

Referring now to FIG. 5 there is schematically shown an embodiment of a high temperature superconductor unit cell 80. By way of example, the unit cell 80 has linear dimensions of approximately two millimeters on a side. It can be seen in FIG. 5 that the unit cell 80 is comprised of a HTS photodetector 82 and a Josephson Junction VCO 84. A resistance ladder network 86 has a plurality of taps one of which provides a reference voltage to the VCO 84. Typically, the network 86 has a number of taps, each having a different voltage. The total number of taps may be equal to the number of unit cells within the array such that each unit cell has a uniquely identifiable frequency band associated therewith. HTS photodetector 82 is provided with an input bias current $I_{in}$ and is comprised of a HTS film photodetector 88 having a shunt Josephson Junction 90 and an associated shunt capacitance $C_s$. The output of detector 82 is a voltage $V_{DET}$ which is combined with the reference voltage, in this case $V_{REF2}$. These two voltages are summed and provided to the VCO 84. VCO 84 is comprised of a Josephson Junction 92 having an associated shunt resistance $R_s$ and an associated shunt capacitance $C_s$. The output of VCO 84 is a frequency given by the expression $f_{OUT} = 2e(V_{DET} + V_{REF2})/h$. That is, the frequency output lies within a frequency band set by the magnitude of the fixed reference voltage, the instantaneous frequency within the band being a function of the radiation incident upon the photodetector 82. The frequency output of the unit cell 80 is provided in conjunction with the frequency outputs of other unit cells of the array to a frequency discriminator (not shown) such as the discriminator 50 shown in FIG. 3A.

It should be realized that the unit cells shown in FIG. 4 and/or FIG. 5 are amendable to fabrication upon a common substrate such that the photodetecting element and the associated voltage controlled oscillator are in close proximity with one another. This provides for a reduction in both circuit complexity and size over those conventional systems which employ a photodetecting array and a second array of output coupling and signal processing devices such as multiplexers and/or transimpedance amplifiers. Furthermore, the components of the unit cells of FIGS. 4 and 5 may be constructed substantially of superconducting material. This feature is a significant improvement over MOSFET-type devices of conventional unit cells in that a signficant reduction in electrical noise and operating temperature is achieved. Further in accordance with the invention the unit cell of either FIG. 4 or FIG. 5 operates in the frequency domain wherein each photodetector of an array of photodetectors is assigned a uniquely specifiable frequency band. This facilitates the addressing of a particular one of the photodetectors within the array. This addressing may be accomplished, as previously described, by providing a swept band of frequencies or a linearly increasing potential which corresponds to the frequency band of the photdetector of interest. Thus, zoom and other functions are readily implemented. Also, it can be appreciated that an array of detectors constructed in accordance with the invention is compatible with parallel signal processing techniques in that all or some large subset of detector outputs are available to the signal processor at any given time.

If it is desired to generate photodetector signals which are integrated over some integration period, as is done in conventional photodetecting arrays, a plurality of detector readings may be so integrated by the signal processor which is coupled to the array. Inasmuch as the integration period is no longer a function of the readout electronics, the integration period may be readily changed during operation by the signal processor.

Based on the foregoing description of the invention those having skill in the art may derive modifications to this description. Thus, the invention is not intended to be limited solely to that described above, the invention is instead intended to be limited only as defined by the appended claims.

What is claimed is:

1. An array of radiation sensitive detectors, comprising:
   a plurality of unit cells, each of said unit cells comprising:
   a radiation detector responsive to incident radiation for generating an output signal having an amplitude which is a function of the radiation incident upon the detector; and
   means, coupled to an output of said detector, for converting the detector output signal to a signal having a frequency the magnitude of which is a function of the amplitude of the detector output signal, the frequency having a value within a specific range of frequencies associated with the radiation detector, whereby
   individual ones of the plurality of unit cells have a unique range of frequencies associated therewith, the unique range of frequencies being substantially non-overlapping with other ranges of frequencies of others of the unit cells.

2. An array as set forth in claim 1 and further comprising means for conveying the frequency output of said converting means to a frequency discriminating means.

3. An array as set forth in claim 2 wherein said frequency discriminating means comprises:
   means for generating a swept band of frequencies;
   means, coupled to said conveying means and to said generating means, for mixing the frequency output with the swept band of frequencies;
   means for indicating when the frequency output corresponds to a frequency within the swept band of frequencies; and
   means, responsive to the operation of said indicating means, for correlating the frequency output within the amplitude of the detector output signal.

4. An array as set forth in claim 3 wherein said generating means includes means for sequentially generating a plurality of swept bands of frequencies, each swept band having frequencies that correspond to the range of frequencies of one of said unit cells.

5. An array as set forth in claim 3 wherein at least said radiation detector, said converting means, said conveying means and said mixing means are each comprised of high temperature superconducting material disposed upon a common substrate.

6. An array as set forth in claim 1 wherein said radiation detector and said converting means are comprised of material which exhibits a Josephson effect.

7. An array as set forth in claim 6 wherein said radiation detector is comprised of a superconductive material.

8. An array as set forth in claim 6 wherein said converting means is comprised of a Josephson Junction voltage controlled oscillator.

9. An array as set forth in claim 6 wherein said converting means is comprised of a weak link voltage controlled oscillator.

10. A method of operating a plurality of radiation detectors comprising the steps of:
    providing a plurality of radiation detectors each of which is operable for generating an output signal having a magnitude which is a function of a characteristic of radiation incident thereon;
    simultaneously converting the output signal of each of the detectors to a periodic signal having an instantaneous frequency within a range of frequencies, the range of frequencies for each of the detectors being substantially non-overlapping with the range of frequencies of others of the detectors, the instantaneous magnitude of the frequency being a function of the magnitude of the output signal; and
    coupling the periodic signals to a frequency discriminator.

11. A method as set forth in claim 10 and further comprising a step of accessing a particular one of the plurality of detectors to determine the magnitude of the particular detector output signal, the step of accessing including the steps of:
    determining a band of frequencies that is substantially equal to the range of frequencies associated with the particular detector;
    comparing the frequency of the periodic signals from each detector with a swept band of frequencies corresponding to the determined band of frequencies;
    identifying a frequency within the swept band of frequencies that substantially equals the frequency of the periodic signal associated with the particular detector; and
    correlating the identified frequency within the swept band with the magnitude of the particular detector output signal.

12. A method as set forth in claim 10 wherein the step of providing a plurality of radiation detectors includes a step of cooling the plurality of radiation detectors below a superconducting transition temperature.

13. A method as set forth in claim 10 and further comprising the steps of:
    comparing the frequency of the periodic signal from each detector with a swept band of frequencies;
    identifying a frequency within the swept band of frequencies which substantially equals the frequency of the periodic signal; and
    correlating the identified frequency within the swept band with the magnitude of the detector output signal.

14. A method as set forth in claim 13 wherein the periodic output signals are coupled individually and sequentially to the frequency discriminator.

15. A method as set forth in claim 13 wherein the periodic output signals are coupled simultaneously to the frequency discriminator.

16. A method as set forth in claim 13 wherein the steps of comparing, identifying and correlating are accomplished repetitively and wherein the swept band of frequencies is changed to a different band of frequencies for each repetition.

17. A unit cell for a photodetecting array operated at cryogenic temperatures comprising:
    a superconductive radiation detector having an output signal the magnitude of which is a function of an amount of radiation incident upon the detector; and
    means coupled to the detector output signal for converting the output signal to a periodic signal having a frequency that is a function of the magnitude of the output signal, the converting means being comprised of at least one component that operates in accordance with the Josephson effect.

18. A unit cell set forth in claim 17 and further comprising transmission line means coupled to an output of the converting means for conveying the periodic signal to signal processing means for identifying the frequency of the periodic signals and for correlating the identified frequency with the amount of radiation incident upon the detector.

19. A unit cell as set forth in claim 17 wherein said converting means includes an input terminal coupled to a bias signal for biasing said converting means such that the frequency of the periodic signal is within a range of frequencies determined by a magnitude of the bias signal.

20. A unit cell as set forth in claim 19 wherein the frequency of the periodic signal is f, wherein the detector output signal is expressed as a voltage $V_{DET}$, wherein the bias signal is expressed as a voltage $V_{REF}$ and wherein the frequency of the periodic signal is given by the equation $$f=(V_{DET}+V_{REF})2e/h.$$

21. An imaging system comprising a plurality of detector means for imaging in parallel incident electromagnetic radiation, characterized in that each individual detector means generates a periodic electrical signal having a frequency value that is a function of a characteristic of the electromagnetic radiation incident thereon, the frequency being within a frequency bin that is uniquely associated with the individual detector means, each of the frequency bins being substantially non-overlapping with others of the frequency bins.

22. An imaging system as set forth in claim 21 and further comprising signal processing means coupled to the plurality of detector means for identifying the frequencies of the periodic electrical signals and for correlating the identified frequencies with the characteristic of the electromagnetic radiation incident upon the associated detector means, the signal processing means further including means for selecting a specified one or ones of the detector means from the plurality of detector means for processing only the periodic electrical signal associated with the selected one or ones of the detector means.

23. An imaging system as set forth in claim 21 wherein the detecting means is comprised of at least one component that operates in accordance with the Josephson effect for generating the periodic electrical signal.

* * * * *